United States Patent
Costin et al.

(10) Patent No.: US 6,576,862 B1
(45) Date of Patent: Jun. 10, 2003

(54) LASER-SCRIBING PROCESS FOR RUBBER AND THERMOPLASTIC MATERIALS SUCH AS A HOSE

(75) Inventors: Darryl Costin, Perrysburg, OH (US); Scott Harris, Santa Fe, CA (US)

(73) Assignee: Technolines LLC, Perrysburg, OH (US)

( * ) Notice: Subject to any disclaimer, the term of this patent is extended or adjusted under 35 U.S.C. 154(b) by 0 days.

(21) Appl. No.: 09/479,830

(22) Filed: Jan. 7, 2000

Related U.S. Application Data

(60) Provisional application No. 60/115,132, filed on Jan. 7, 1999.

(51) Int. Cl.[7] .................. B23K 26/00; B23K 26/14; B23K 26/16
(52) U.S. Cl. .............. 219/121.6; 219/121.68; 219/121.69
(58) Field of Search ............... 219/121.6, 121.68, 219/121.69

(56) References Cited

U.S. PATENT DOCUMENTS

| | | | | |
|---|---|---|---|---|
| 3,803,637 A | * | 4/1974 | Martin et al. ........... | 219/121.68 |
| 4,534,313 A | * | 8/1985 | Louvel ................ | 118/242 |
| 4,701,869 A | * | 10/1987 | Callegari et al. ....... | 219/121.69 |
| 4,961,080 A | * | 10/1990 | Henderson et al. ....... | 347/248 |
| 5,049,721 A | * | 9/1991 | Parnas et al. .......... | 283/70 |
| 5,075,195 A | * | 12/1991 | Babler et al. .......... | 360/255.2 |
| 5,130,721 A | * | 7/1992 | Sukhman ............... | 219/121.68 |
| 5,373,138 A | * | 12/1994 | Locklear et al. ........ | 219/121.69 |
| 5,420,575 A | * | 5/1995 | Cheraso et al. ......... | 206/459.6 |
| 5,454,881 A | * | 10/1995 | Fischer ............... | 219/121.69 |
| 5,477,023 A | * | 12/1995 | Schneider et al. ...... | 219/121.68 |
| 5,560,845 A | * | 10/1996 | Birmingham et al. .. | 219/121.69 |
| 5,575,931 A | * | 11/1996 | Stefani ............... | 219/121.68 |
| 5,718,457 A | * | 2/1998 | Weinstock ............ | 283/70 |
| 5,808,268 A | * | 9/1998 | Balz et al. ........... | 219/121.69 |
| 5,855,969 A | * | 1/1999 | Robertson ............. | 427/387 |
| 5,880,430 A | * | 3/1999 | Wein .................. | 219/121.69 |
| 5,916,461 A | * | 6/1999 | Costin et al. ......... | 219/121.68 |
| 6,022,905 A | * | 2/2000 | Harris et al. ......... | 522/2 |
| 6,078,468 A | * | 6/2000 | Fiske ................. | 360/255.2 |
| 6,144,011 A | * | 11/2000 | Moss et al. ........... | 219/121.68 |
| 6,150,629 A | * | 11/2000 | Sievers ............... | 219/121.62 |
| 6,160,568 A | * | 12/2000 | Brodsky et al. ........ | 148/241 |
| 6,238,847 B1 | * | 5/2001 | Axtell et al. ......... | 347/248 |
| 6,252,196 B1 | * | 6/2001 | Costin et al. ......... | 219/121.61 |
| 6,275,250 B1 | * | 8/2001 | Sanders et al. ........ | 219/121.69 |

FOREIGN PATENT DOCUMENTS

| | | | | |
|---|---|---|---|---|
| JP | 8-114893 A | * | 5/1996 | ............ 219/121.68 |

* cited by examiner

Primary Examiner—Tom Dunn
Assistant Examiner—L. Edmondson
(74) Attorney, Agent, or Firm—Scott C. Harris, Esq.

(57) ABSTRACT

A laser apparatus which operates to mark specified information on a rubber or plastic product, such as a hose. The information is marked using a laser whose energy density per unit time is controlled. The information can.be an alphanumeric information, or a graphic, and can be written while the hose is in motion on a conveyor.

11 Claims, 2 Drawing Sheets

LASER-SCRIBING PROCESS FOR RUBBER AND THERMOPLASTIC MATERIALS SUCH AS A HOSE

CROSS-REFERENCE TO RELATED APPLICATIONS

This application claims benefit of U.S. Provisional application No. 60/115,132, filed Jan. 7, 1999.

BACKGROUND

The typical manner in which Rubber & Thermoplastic Hose manufacturers identify or mark their product is from one of several on-line printing processes. Laser ink jet print technology can be used to impart an ink print of alphanumeric text on the hose. Embossing or stamp printing apply a metal stamp to the hose with some pressure to create an impression of the alphanumeric text on the hose. Yet another printing process is the vinyl overlay process where a vinyl sheet with the alphanumeric text is placed over the rubber and a protective sheet is then placed over the vinyl before heat processing.

Many of these printing processes must be applied before the vulcanization process of rubber hose. This limits the manufacturer's flexibility for custom production or inventory reduction.

SUMMARY

The present system describes a special hose writing process in which the alphanumeric print is applied using a laser to scribe information on the outer surface of a rubber or plastic product, such as a hose, a tire, medical supplies, computer casing or the like.

One aspect is a method of marking a rubber or plastic material, that includes forming a desired pattern to be marked on the rubber or plastic material, and using the desired pattern to change an output of a laser, and applying the laser output to the material to mark the desired pattern on the material, the laser being applied with parameters that do not undesirably damage the material of said material, but which does form a perceivable mark indicative of said pattern on said material.

BRIEF DESCRIPTION OF THE DRAWINGS

These and other aspects will be described with reference to the accompanying drawings, wherein.

DETAILED DESCRIPTION

Figure 1:
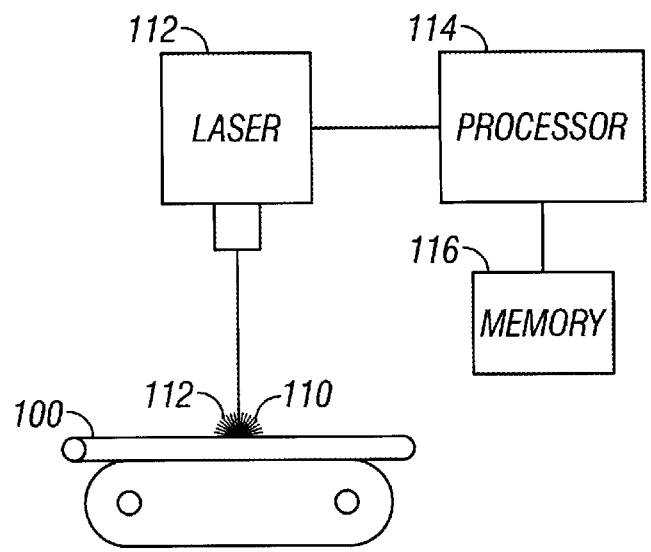
FIG. 1 shows a conveyor system.

One most common application of this system will be in marking a rubber or plastic material with a cylindrical cross section, e.g., a hose. This marking can be done at any time, including after the vulcanization process. This allows the manufacturer to make generic hose and later customize the basic hose after the vulcanization process for the specific customers.

The prior art printing processes noted above often limits the minimum size orders, e.g. to a minimum quantity of several thousand feet, before it is economical to make a production run for the customer. However, with a post vulcanization printing process, the manufacturer could make a continuous production run and simply print the different alphanumeric text required for each customer on the rubber hose after the vulcanization process is complete.

Advantages include the following. Alphanumeric print is imparted on the hose from the first shot to the last shot with the same precision, allow reduced production of scrap reduction and hence yield improvement.

Since this uses only laser energy, no extra material, e.g. ink jet or vinyl need be used. These extra materials which would represent material consumable costs which add to the unit costs for the hose.

This system also allows customization for each section of hose by incrementing or serializing the numerics on the hose so that the hose can be precisely identified with respect to manufacturer, plant location, and date and shift of production. Often when hoses rupture or fail, product liability claims follow and it is sometimes difficult to identify the hose manufacturer, let alone the plant, shift and date of production because the ink has been abraded or worn off with time and exposure to the environmental conditions in which the hose is used.

The present system discloses a laser-scribing process that produces information on the fly, and alters the outer surface of the hose in way that can be viewed by a consumer.

TechnoLines has applied for several patents utilizing novel laser-scribing technology to impart graphics and alphanumeric text on automotive and textile materials, apparel fabrics, leather, vinyl and suede. These concepts are disclosed in U.S. Pat. No. 5,990,444 and others. A key to TechnoLines series of patents is the understanding that a critical variable which controls the successful application of a graphic image on such materials is the energy density per unit time or EDPUT. EDPUT is a function of the power of the laser, speed, and distance from the laser to the material, waveform and frequency.

TechnoLines discovered that if too little EDPUT is used, imparted on the material, the graphic image would be easily washed off or abraded, or even not seen at all. Conversely, too much EDPUT causes numerous undesirable defects such as carbonization and burn-through. This results in an imperfect image, and also a damaged material.

The concept of EDPUT is important in the case of laser scribing alphanumeric text on rubber and thermoplastic hose. Too little EDPUT would result in the printed image abrading off with time such that the hose manufacturer cannot be easily identified upon product liability claims. Too much EDPUT would result in defective products that cannot withstand the pressure and temperature for which the hose was designed.

Based on numerous experiments with both Yag and $CO_2$ lasers on a variety of different rubbers and thermoplastic hoses the following EDPUT range has been identified for such products as disclosed below:

| Hose Type | Acceptable EDPUT range |
|---|---|
| Rubber Hose for Trucks | 2–236 watts/$cm^2$-sec |
| Rubber Hose for Industrial | 4–678 watts/$cm^2$-sec |
| Nylon Hose | 1–349 watts/$cm^2$-sec |
| Thermoplastic hose | 1–123 watts/$cm^2$-sec |

An embodiment is shown in FIG. 1. The hose 100 is shown on a conveyer belt 102 which conveys the hose along a processing line. As a specified point 110 on the hose a position of the hose crosses the output path of the laser 112. Laser 112 is preferably a numerically controlled laser, such as available from Excel control laser, driven by a processor 114. The processor provides commands to the laser to control the output of the laser including the shape of the output beam, and power of the output beam. The power of the output beam is kept preferably kept within the acceptable EDPUT range disclosed above.

Figure 2:
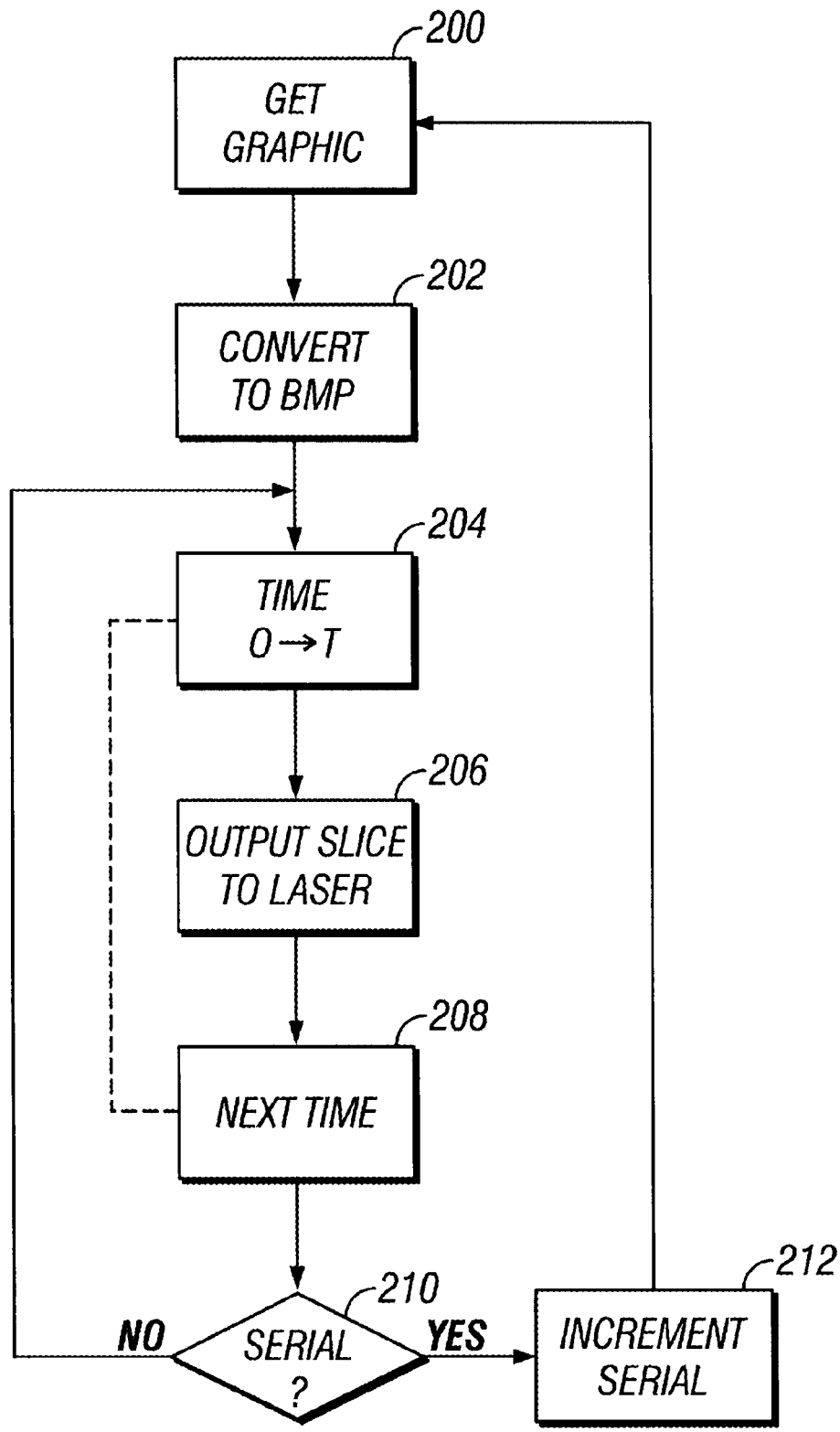
FIG. 2 shows a flowchart of operation.

The processor is programmed to run the laser according to a prestored program. A flowchart of that program is shown in FIG. 2. At step 200 the system operates to obtain the graphic to be inscribed onto the hose. This can be done by obtaining a graphic e.g. a logo from a prestored library stored in memory 116. In the case of a serial number, the starting serial number can also be stored in memory 116, and the serial number is incremented as described herein. In any case, the graphic is obtained at step 200. The format is preferably changed to a simple format of grayscale or 1-bit bitmap, to facilitate control of the numerical laser.

Figure 3:
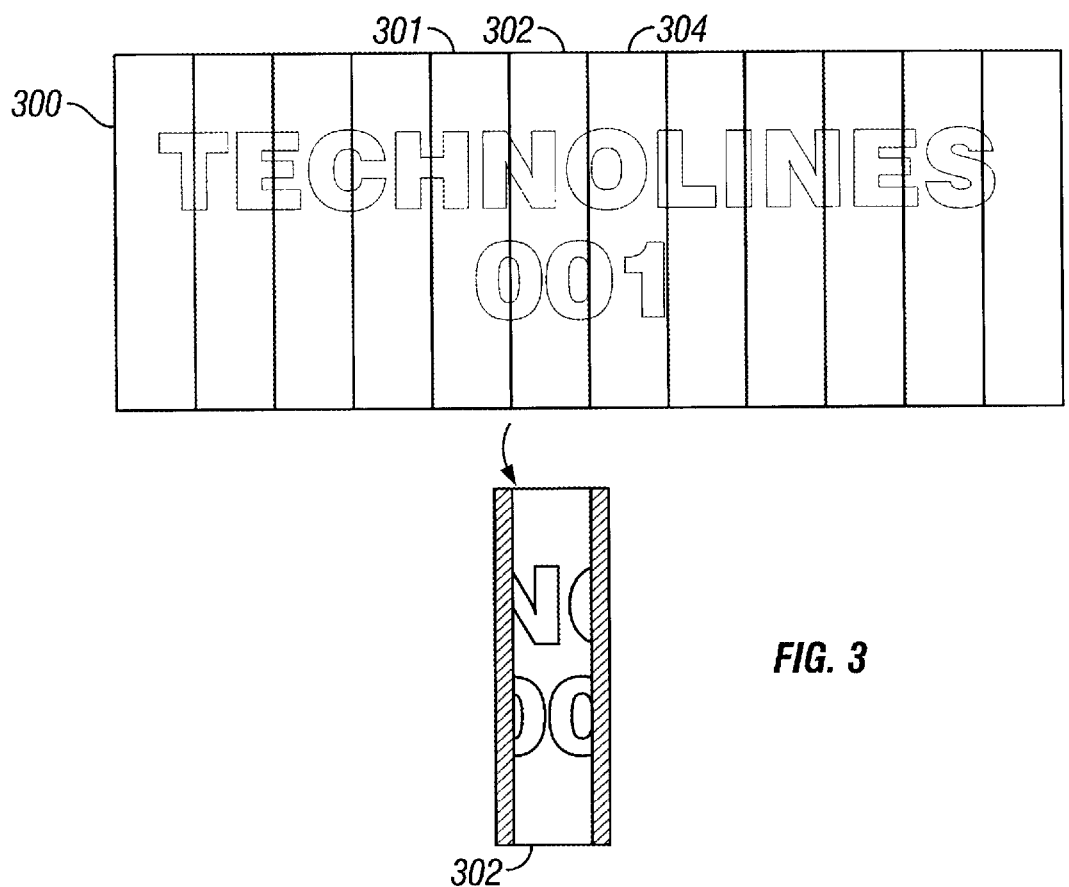
FIG. 3 shows the technique of slicing the graphic.

The bitmap-converted image is shown in FIG. 3. Area 300 represents the bitmap for the logo of Technolines, and serial number 001. At step 204, the bitmap is sectioned into a desired number of sections. Preferably the number of sections is set such that each section corresponds to the width 112 of the laser's swipe on the hose. Narrower sections provide better writing resolution.

At each time T, each slice is inscribed on the hose. FIG. 3 shows how a representative slice 302 is output to the laser. That representative slice is then inscribed on the hose at the time corresponding to the slice 302. At time T+1, the next slice 304 is inscribed on the hose or if the device is running in the reverse direction, the previous slice 301 could be inscribed on the hose. The logo may also be stored in mirrored form, depending on which the way the hose is moving and the desired effect.

The slice is inscribed at step 206, followed by operation for the next time at step 208. At step 210, the system determines whether a serial number is being imprinted. If not, the next logo will simply be inscribed on the hose at the next time, and hence flow returns to step 204 which re-segments and re-writes the same logo. If a serial number is being inscribed, however, the serial number is incremented at 212, followed by obtaining the graphic again at 200 and converting the new graphic to bitmap at 202.

This allows the information to be printed on a continuously-moving conveyor. Each laser write preferably prints only a very small amount so that the desired effect can be obtained while the conveyor continues running.

It is also possible to carry out the operation by stopping the conveyor, printing, and then re-starting the conveyor. In that case, the slices can be made larger, or the laser can move its output beam along the hose to inscribe the information on the hose.

Advantages of the TechnoLines laser scribing process are that the manufacturer can impart a graphic or alphanumeric image on the hose at any time, including after vulcanization or just before packaging. In this way, the manufacturer can make ☐vanilla☐ hose continuously and customize the hose for specific customers on the fly by simply lazing the alphanumerics on the hose before packaging. The manufacturer can make small orders. This laser scribing process further allows the manufacturer to print serialized and unique numbers on each section of hose to allow for specific identification of the manufacturer, plant, date and shift of production. The TechnoLines laser scribing process would improve the manufacturing costs vs. the conventional printing processes because the process can be done with no material consumables and the yield is extremely high due to the precision and repeatability of the laser. Hence, the manufacturing costs would be reduced.

Although only a few embodiments have been described in detail above, other modifications are contemplated.

What is claimed is:

1. A method comprising:
    forming a desired pattern to be marked on a rubber or plastic hose;
    using said desired pattern to change an output of a laser, and applying the laser output to the hose to mark the desired pattern on the hose, the laser being applied with parameters that do not undesirably damage the material, but which forms a perceivable mark indicative of said pattern on said hose; and
    said parameters include at least control of an amount of energy applied to a unit area of the hose to amount of energy which allows said hose to withstand its designed for pressure.

2. A method as in claim 1 wherein said control includes controlling said amount of energy to a value between 2 and 600 watts per cm.

3. A method as in claim 1 wherein said pattern is indicative of alphanumeric information, and said applying comprises writing said information while moving said material.

4. A method as in claim 3 wherein said writing comprises defining a rectangular slice of the information to be written, and writing one of said rectangular slices at each said predetermined time, while the material is moving.

5. A method as in claim 3 further comprising first writing a first item of information, changing said item of information, and second writing a second item of information different than said first item of information.

6. A method as in claim 5 wherein said items of information include unique identifying indicia.

7. A hose marking apparatus, comprising:
    a conveyer, having a surface for holding a cylindrically-cross sectioned rubber or plastic hose material, and operated to move said hose along a path of movement; and
    an electrically controllable laser, having an output which is directed to a point above a surface of said conveyer and which is controlled to produce an output signal indicative of information, said output signal having a specified energy density per unit time, said output signal changing an outer surface of said hose in a way that produces a perceivable change to said outer surface without altering a capability of said hose to withstand a designed-for pressure.

8. An apparatus as in claim 7 wherein said information is a graphic.

9. An apparatus as in claim 7, wherein said information is alphanumeric.

10. An apparatus as in claim 7, wherein said movement of said conveyor is constant, and said changing occurs during said movement.

11. An apparatus as in claim 7, wherein said conveyor starts and stops its movement.

* * * * *